Oct. 4, 1927.
W. F. HART
1,644,373
RAIL FASTENING MEANS
Filed April 28, 1926
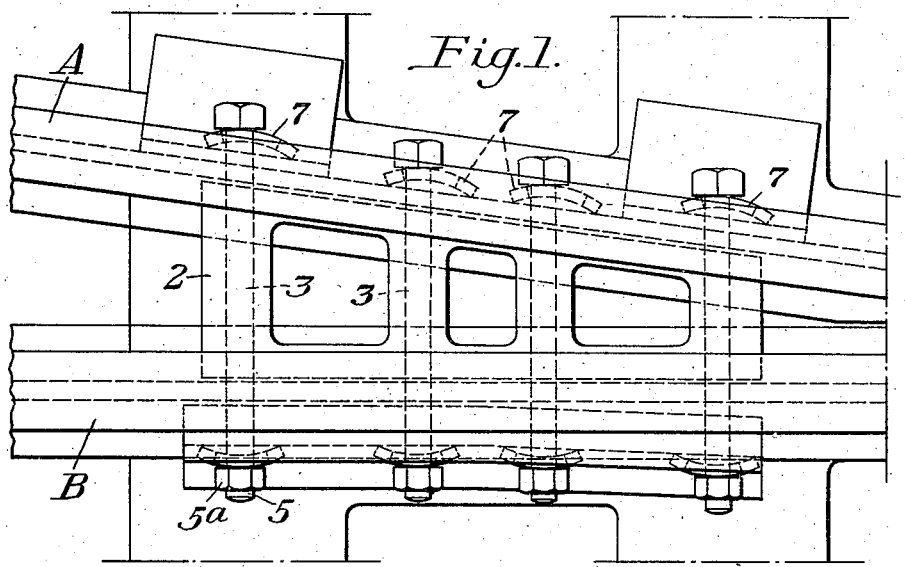
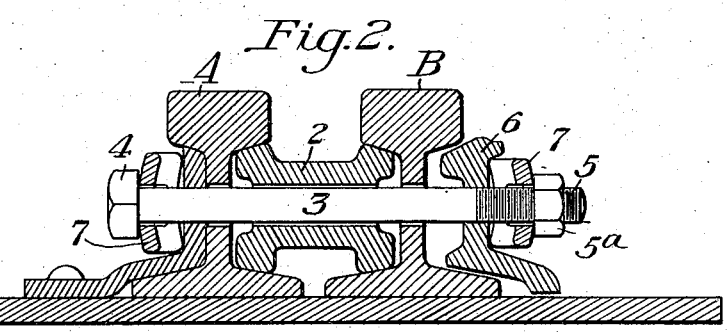
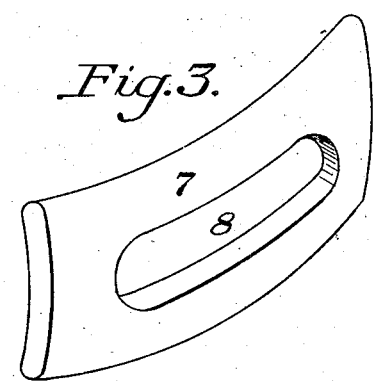
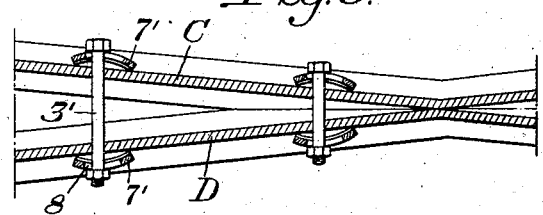
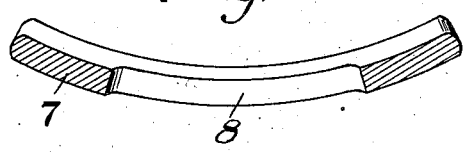
INVENTOR
William F. Hart, Patented Oct. 4, 1927.

1,644,373

UNITED STATES PATENT OFFICE.

WILLIAM F. HART, OF PITTSBURGH, PENNSYLVANIA, ASSIGNOR TO THE VERONA TOOL WORKS, OF PITTSBURGH, PENNSYLVANIA, A CORPORATION OF PENNSYLVANIA.

RAIL-FASTENING MEANS.

Application filed April 28, 1926. Serial No. 105,158.

The present invention relates broadly to the art of railways, and more particularly to installations embodying non-parallel rail sections, such as are present in frogs, crossovers and the like.

In installations of the character referred to comprising rail sections extending in angular relation one with respect to the other, considerable difficulty has been heretofore experienced in providing not only suitable bearing means for the fastening bolts, but also locking means for preventing loosening of the nuts. In view of the difficulties experienced in this connection, it has been not an uncommon practice for purchasers of such installations to specify the character of the through-bolts and to further provide that they shall be fitted with head locks, nut locks and bevel washers where necessary to afford square bearing, as well as suitable washers where required to bring the nuts from under the rail heads into position where they may be engaged and tightened with a standard wrench.

With non-parallel rail sections fastened by means of through bolts, it is almost impossible to have the bolts extend perpendicularly to both of the rail sections. Whether the bolts extend angularly at an angle other than right angles to one or both of the rail sections, a considerable problem is presented in providing suitable bearing means whereby a square seating surface for the heads, nuts or bolts is provided. The bevel washers or wedges ordinarily utilized for this purpose are objectionable to a considerable extent not only in that they do not effect any retaining action or locking action on the bolts, but for the further reason that care must be exercised in their installation, such structures obviously not being reversible.

Due to the fact that work on installations of the general character herein contemplated is quite frequently performed by unskilled labor, it is extremely desirable not only to provide means such that improper assembly is made impossible, but also of such nature that an automatic compensation for irregularities is obtained to insure a true seating surface together with an automatic interengagement with the bolt or nut carried thereby in such manner that loosening of the parts is effectively prevented.

It is one of the objects of the present invention to provide an improved spring adapted to replace tapered washers or wedges as heretofore utilized and serving not only to maintain the parts of the installation tight, but to provide effective seating surfaces and to automatically compensate for irregularities or angular variations in different structures.

In the accompanying drawings there are shown for purposes of illustration only, certain preferred embodiments of the present invention, it being understood that the drawings do not define the limits of my invention as changes in the construction and operation disclosed therein may be made without departing either from the spirit of the present invention or the scope of my broader claims.

In the drawings:

Figure 1 is a top plan view of a portion of a spring rail frog embodying the present invention.

Figure 2 is a transverse sectional view, on an enlarged scale through the structure of Figure 1.

Figure 3 is a perspective view of the spring.

Figure 4 is a longitudinal sectional view through the spring of Figure 3, and

Figure 5 is a horizontal sectional view through a rail cross.

In many built up sections constituting standard installations in present railway systems, one rail section not infrequently extends at an angle to another rail section, or both rail sections are disposed at similar or different angles, with the result, in all cases, that non-parallel rail sections are provided. Such conditions are found, for example, in girder or T rail crosses or crossovers, in girder or T rail mates, in girder or T runoffs, in built-up girder or T frogs whether stiff or spring, in tongue switches and the like. The present invention is equally applicable to constructions falling within any of these or similar types, all of such installations being hereinafter referred to as non-parallel rail sections.

In Figures 1 and 2 of the present drawings there is illustrated a portion of a standard rail spring frog installation embodying non-parallel rail sections A and B. These rail sections in accordance with usual practice may be spaced by means of a toe-block 2 of malleable iron or other suitable materials. For fastening the rail sections and the toe block together there may be provided through bolts 3 having square heads 4 in accordance, for example, with the standard requirements of many railroads at the present time, and having threaded portions 5 adapted to extend through suitable openings provided in a joint bar 6.

With the arrangement illustrated in Figures 1 and 2 it will be clearly apparent that while the through bolts extend substantially normal to the rail section B, they do not extend at right angles to the rail section A. Due to this angularity considerable difficulty has heretofore been experienced in providing a proper seating surface for the bolt heads, tapered washers or wedge blocks ordinarily being required. In accordance with the present invention, such washers or wedge blocks are made unnecessary, their place being taken by special springs 7 which are preferably curved both longitudinally and transversely as shown on Figure 3, and which are provided with an elongated bolt receiving opening 8 extending through the crown of the spring. By utilizing springs of this character, the springs may be reversed end for end in a manner not possible with washers, wedge blocks or the like, without affecting their utility. At the same time, due to the fact that the springs have only a limited area of contact with the rails, joint bars, plates, or the like with which they cooperate, an automatic compensation is effected.

In actual operation, a spring of the general character herein referred to is preferably inserted both under the head of each of the bolts as well as under the nut 5ª. In actual practice, upon tightening the nuts, the springs cooperating with the rail section A will tend to travel toward the narrow portion of the frog, but in all cases they will not only provide a true seating surface for the bolt head, but will serve to project the heads of the bolts beyond the heads of the rails in such manner that they are readily accessible. In like manner they serve to project the nuts to an accessible point in similar manner, thereby further obviating the use of special washers for this purpose.

In actual practice, the nuts will usually not be tightened to an extent to completely flatten these springs, but only to place the springs under such a degree of compression that they will be effective to compensate for looseness due to bolt stretch or mechanical wear of the various parts. In this manner a tight connection is maintained at all times, the springs further cooperating with the bolt heads and nuts in such manner as to more or less effectively prevent relative rotation and consequent loosening of these parts.

In Figure 5 there is shown more or less diagrammatically a horizontal sectional view through a portion of a cross embodying sections C and D both of which are angularly arranged in such a manner that the through bolts 3' do not extend in a direction normal to either of the rails. In such cases the provision of springs 7' under both the heads and the nuts is particularly desirable as will be readily apparent. The elongated opening 8 permits the springs to automatically adjust themselves not only with respect to the section with which they cooperate, but irregularities in such section.

The advantages of the present invention arise from the provision of an installation including non-parallel rails in which proper seating of the through bolts is automatically obtained.

Other advantages arise from the installation of the character referred to including means for automatically compensating not only the irregularities in the angularity or contour of the rail sections, but for looseness caused by stretch or wear of the parts of the installation.

I claim:

1. Fastening means for non-parallel rail sections, comprising a through bolt extending through both of the rail sections, and a joint spring cooperating with said bolt and providing an automatically adjustable seating surface for the bolt head.

2. Fastening means for non-parallel rail sections, comprising a through bolt extending through both of the rail sections, and a joint spring cooperating with said bolt, said joint spring having an elongated opening formed therein to permit the spring to automatically adapt itself to the angularity of the rail sections with which it cooperates.

3. Fastening means for non-parallel rail sections, including said sections, a through bolt extending through both of said sections, and a joint spring cooperating with each end of the said bolt and providing an automatically adjustable seating surface for the bolt head and nut.

4. Fastening means for non-parallel rail sections, including said sections, a through bolt extending through both of said sections, and a joint spring cooperating with each end of the said bolt, at least one of said joint springs having an elongated opening therein.

5. Fastening means for non-parallel rail sections, including said sections, a through bolt extending through both of said sections, and a joint spring cooperating with each end of the said bolt, said joint spring being longitudinally curved to provide inwardly projecting rail engaging ends.

6. A rail spring for rail installations including non-parallel rails, comprising a longitudinally curved body portion having an elongated opening through the crown thereof.

7. A rail spring for rail installations including non-parallel rails, comprising a longitudinal and transversely curved body portion having an elongated opening through the crown thereof.

In testimony whereof I have hereunto set my hand.

WILLIAM F. HART.